US011310719B1

United States Patent
Boschulte et al.

(10) Patent No.: US 11,310,719 B1
(45) Date of Patent: Apr. 19, 2022

(54) PEER-TO-PEER SELF-ORGANIZING MOBILE NETWORK

(71) Applicant: Mobile Mobile Co, Mendham, NJ (US)

(72) Inventors: Alfred F. Boschulte, Kissimee, FL (US); Victor Schnee, Mendham, NJ (US)

(*) Notice: Subject to any disclaimer, the term of this patent is extended or adjusted under 35 U.S.C. 154(b) by 12 days.

(21) Appl. No.: 16/776,472

(22) Filed: Jan. 29, 2020

Related U.S. Application Data

(60) Provisional application No. 62/798,822, filed on Jan. 30, 2019.

(51) Int. Cl.
| | |
|---|---|
| G06F 16/27 | (2019.01) |
| H04W 88/16 | (2009.01) |
| H04W 84/18 | (2009.01) |
| H04W 88/10 | (2009.01) |
| H04W 40/24 | (2009.01) |
| H04W 64/00 | (2009.01) |
| H04W 40/02 | (2009.01) |

(52) U.S. Cl.
CPC .......... *H04W 40/248* (2013.01); *G06F 16/27* (2019.01); *H04W 40/02* (2013.01); *H04W 64/003* (2013.01); *H04W 84/18* (2013.01); *H04W 88/10* (2013.01); *H04W 88/16* (2013.01)

(58) Field of Classification Search
CPC .... G06Q 10/06; G06Q 2220/10; G06Q 40/04; H04L 63/0464; H04L 63/102
See application file for complete search history.

(56) References Cited

U.S. PATENT DOCUMENTS

| | | | |
|---|---|---|---|
| 9,965,804 B1* | 5/2018 | Winklevoss | G06Q 40/04 |
| 2019/0098640 A1* | 3/2019 | Holakouei | H04W 28/0236 |
| 2019/0386969 A1* | 12/2019 | Verzun | H04L 63/102 |

* cited by examiner

*Primary Examiner* — Iqbal Zaidi

(57) ABSTRACT

Systems, devices, and methods for operating a peer-to-peer self-organizing mobile network are disclosed herein, where at least some routing information for the network is stored in a permissioned blockchain ledger, where updates to the routing information are transmitted in blockchain blocks via a private wireless signaling network, and where at least some routing information is updated by individual network devices via smart contracts.

17 Claims, 10 Drawing Sheets

PEER-TO-PEER SELF-ORGANIZING MOBILE NETWORK

CROSS-REFERENCE TO RELATED APPLICATIONS

This application claims priority under 35 U.S.C. § 119 to U.S. Provisional Application 62/798,822 titled "Peer-to-peer self-organizing mobile network," filed on Jan. 30, 2019. The entire contents of application 62/798,822 are incorporated herein by reference for all purposes.

FIELD OF THE DISCLOSURE

The present disclosure is related to methods, systems, products, features, services, and other elements directed to communications networks and aspects thereof.

SUMMARY

Under current cellular network architecture, User Equipment (UE), such as smartphones and other devices, (often referred to as the "Edge") communicate with the Fixed Network of a mobile carrier. The Fixed Network includes two broad sectors: (1) Carrier cell sites, ("eNodeBs," or "eNBs"); and (2) the Core of the network supporting the cell sites, the "Evolved Packet Core" ("EPC").

Fixed network architecture is quite old, dating back nearly a century and a half in fixed telecommunications and pervading mobile networks since the dawn of the modern mobile age in the 1980s. In the early days of mobile networks, an architecture of static sites—"Macro" sites and an increasing number of smaller ones—was understandable: One moving part, the user, in a given radio access network was enough of a dilemma: with limited digital signal processing power available at the time in handset devices; with coverage for voice conversations the sole goal; and with a limited number of mobile users to be served.

Now events are overtaking this aging concept. The "Edge" of the network, namely the devices, are progressing on a development path that the Fixed Networks and the "Core" of these networks are unable to keep up with satisfactorily. There is already a staggering amount of underutilized processing power in smartphones, for example, and this power increases with each new generation of product release, as explained at "Smartphones: A Supercomputer in Your Pocket," Northeastern Univ. Level Blog (Apr. 21, 2016). The explosion of demand and its constantly changing characteristics—streaming video, AI (artificial intelligence) implementations, AR/VR (artificial reality/virtual reality), the IoT (Internet of Things), and more—has brought ever-increasing attention to the needs of the so-called Edge of the network along with corresponding technical challenges for how to solve issues related to network coverage, latency, capacity, security, and more.

"Connectivity" is demanded everywhere, in all types of "things" to be connected to the network and to each other. And the absence of universal coverage is increasingly a problem around the globe at least partly because of the significant costs associated with extending the carrier cell sites and core network beyond the current edge of the mobile network.

Existing cellular networks were not architected with the idea of allowing a high number of diverse distributed mobile modalities to have virtually unlimited access and universal connectivity. The attention of legacy mobile players—carriers, equipment providers, component suppliers and others—is concentrated on pouring more money and resources into the fixed network infrastructure. Most of this attention is devoted to promoting the development and implementation of 5G, the next "generation" of fixed technology. Other developments, such as Edge Computing and Fog Computing, also seek to add new layers and new investment to the fixed network.

Other developments, some of which were not supported by mobile carriers, or were opposed by them, have supplemented carrier fixed networks in various regards. WiFi, which was formally launched in 1997, may have been the most significant of these developments to date. WiFi enabled interconnection to the Internet over unlicensed spectrum bands, via WiFi hotspots (both fixed and mobile device-based hotspots), generally avoiding the use of cellular networks and incurring of minutes of data use by the user.

This has resulted in massive, and growing, "offloading" of data traffic from cellular networks to WiFi. In 2017, while wired networks accounted for 48 percent of IP traffic, Wi-Fi accounted for 43 percent, and mobile or cellular networks accounted for 9 percent of total global IP traffic, as explained in "Cisco Visual Networking Index 2018." Mesh networking originated with the military about 30 years ago. Use of mesh networking may also permit avoidance of cellular networks and related charges.

The attractive characteristics of mesh networks include: speed to implement and relatively low cost, as they do not require extensive or costly infrastructure (and may not require any infrastructure at all); decentralization, so that the failure of a node will not bring down the rest of the network; and the ability to gain online connectivity for multiple users or nodes as long as anyone can connect.

There are two general categories of mesh networks: (1) infrastructure-based, which employ hardware routers and access points; and (2) client-based, which rely on software apps in mobile devices and do not require any additional infrastructure.

Client-based mesh networks received a major boost from Apple's incorporation of its "Multipeer Connectivity Framework," into iOS 7 (released 2013). This enabled iPhones to connect to each other over Bluetooth or WiFi, bypassing the need for a cellular network link. This has led to the proliferation of P2P (peer-to-peer) apps, Open Garden's FireChat being among the most prominent.

Bluetooth is a short-range wireless transmission technology, introduced in the 1990s, utilizing unlicensed spectrum. It enables connection between devices without the need for a router or other central device. In 2017, the Bluetooth standards body, Bluetooth Special Interest Group (SIG), released Bluetooth Mesh, which allows extending Bluetooth networks via mesh networking topology.

Since 2000, a number of technologies have been developed, largely with the intention of serving communications needs of the Internet of Things (IoT). These include initiatives of both non-carrier and carrier affiliated groups. Examples include LPWAN, Edge and Fog Computing, Zibgee, Dedicated Short-Range Communications, and others.

LPWAN (low power wide area network) is a series of different offerings that have long battery lives and are suited to low bit rate transmission over distances of several kilometers or more. Various approaches to LPWAN have been developed by non-carrier companies and organizations, including, for example, LoRa, Wireless Smart Utility Network (Wi-Sun), Sigfox, Weightless/Nwave, Ingenu, and others. Carriers have offered other alternatives such as Narrow Band IoT (NB-IoT), Cat M1, and Cat NB1.

Edge and Fog Computing were originated more recently, with the general concept being that more processing of information from various "edge" devices, such as IoT equipment, should be done closer to the devices themselves. This might involve transmitting information to the cloud, or to hubs located closer to the devices, or might involve incorporating more processing capabilities in the edge devices themselves.

Zigbee, a technology standardized after 2000 by the IEEE, is a low power offering, effective over short distances, that uses a mesh topology. It has found uses in hundreds of millions of devices and other equipment, such as IoT devices, that require low data rates.

Dedicated short-range communications (DSRC) refers to a 75 MHz spectrum allocation in the 5.9 GHz band, made by the FCC in 1999 for use in intelligent transportation systems and connected vehicles.

Other developments have been proposed by various parties in the wireless industry. For example, U.S. Pat. Pub. 2006/0291482 proposes creating a metropolitan mesh network using vehicles as the framework. It proposes turning vehicles into mobile access points through installation of mobile routers.

U.S. Pat. No. 9,854,408 proposes alleviating radio congestion or capacity issues through use of a vehicle, referred to as a drone, that is equipped with a radio enabling it to act as a cellular network cell site, and which is directed by a self-organizing network.

U.S. Pat. No. 9,973,386 proposes a networking platform with self-healing and self-configuration capability, that would apply to various types of networks, fixed and mobile, and that could include some type of devices on vehicles, that could facilitate transferring data from vehicles to the cloud.

U.S. Pat. No. 6,879,574 proposes standalone, ad-hoc networks as an adjunct to the backbone mobile networks. These ad-hoc networks could integrate to the Internet through cellular or other access networks.

The Motorola LXN 500 is a portable device that contains an eNB and EPC, as well as an optional Application. The device weighs about 12 pounds (closer to 30 pounds with its associated backpack.) It is advertised as being capable of creating LTE service up to 1 km from the eNB on demand and hosting up to 100 subscribers.

None of these developments, devices or services—nor all of them taken together—offer a comprehensive, scalable solution to proliferating mobile wireless access as widely as possible, expeditiously and cost effectively, as the embodiments disclosed herein.

Because the carrier networks are fixed, they lack flexibility and cannot easily adjust to changing patterns of demand. New generations of networking technology involve major investments in new fixed plant.

Furthermore, while Universal Service and Universal Connectivity have long been sought-after goals of the telecommunications industry, the industry has never come close to achieving these objectives.

Furthermore, while a vast amount of spectrum is available for wireless transmission, as much as 600 MHz or more, and will be available for use by the embodiments disclosed herein, today's smartphones generally confine the choice of spectrum bands to about 80 MHz. In addition, these devices, proposals, and carrier networks do not make provision for optimizing the choice of spectrum band to the type of transmission being attempted, or the requirements, i.e. latency, speed, quality of service factors of the applications being used or tasks undertaken. The embodiments disclosed and described herein provide both of these features regarding added amount of accessible spectrum and optimizing choice of spectrum.

The embodiments disclosed herein address these and other limitations of mobile networks by providing for a peer centric distributed network in which existing and future mobile devices, as well as vehicles and other objects, are upgraded with certain aspects of certain key network intelligence that today resides in fixed mobile infrastructure networks of carriers. These upgrades will reflect the latest in software technology, appropriate to serving specific edge networks based on edge computing, and able to offer SOC (system on a chip) hardware upgrades not possible with local, regional, national or global infrastructure legacy systems.

The hardware and software disclosed herein will permit deployment of new mobile access points (and upgrading existing mobile access points) with key network intelligence and capability, creating Virtual Mobile Network Sites (VMNSs)—streamlining and re-architecting mobile communications networking and virtual private wireless networks.

These mobile access points include, among other devices, mobile devices of all types, transport vehicles of all types, other vehicles and other types of objects, such as drones (UAVs, unmanned airborne vehicles), balloons, satellites, motes (small computers for remote sensor applications), or other airborne objects and robots and other terrestrial objects. As devices become more and more powerful, and connectivity and intelligence are also brought to vehicles of all types, these mobile access points will be able to operate increasingly independently of the established legacy mobile fixed networks, in effect creating the "Mobile Mobile Network" (MMN) of the future.

The embodiments disclosed herein provide a hardware and software platform to enable and to manage communications among disparate VMNSs (Virtual Mobile Network Sites) from all types of mobile and other modalities.

Disclosed embodiments provide one or more of the following benefits, and perhaps other benefits, that help to avoid or at least ameliorate related problems and limitations of current mobile networking:

Lower Costs. Lower costs for mobile network users, by eliminating or reducing, the stranglehold of the oligopolistic mobile carriers;

Less Complexity. Reduced complexity, by enabling widespread peer-to-peer networking among larger numbers of devices utilizing the invention;

Increased Choices. Six-to-sevenfold, or greater, increase in the amount of spectrum readily accessible to the average user;

Better Service. Choice of frequency can be matched to the requirements of the application (or other operation) the user is using;

Flexible Capacity. Capacity will flexibly move to where demand, in the form of mobile devices, actually is;

Greater Coverage. Vastly increased coverage compared to existing mobile networks—leading to universal connectivity—enabling communications without dependence on proximity to carrier cell sites, which will also enhance the ability of less economically developed areas to enjoy the benefits of mobile services without relying on large investments in fixed infrastructure;

Better Security and survivability. Increased security—through the ability of users to create multiple private networks that can utilize private addressing and exist securely in "dark clouds;" Better survivability— through self-organizing ability and with each node knowing the network nodal structure.

User Control. Ability to create and control their personal and business work environment, including multiple types of devices: home devices, smart personal devices, vehicles, such as autos, bikes, drones, etc.;

Resource Sharing. The ability to share or trade resources, including networking, processing and storage capacity among various peers and to be rewarded accordingly for sharing; and the ability to share or trade other virtual or real assets.

Reduced Carrier Capital Spending. The capability of extending the reach and presence of mobile service without a need for carriers to make incremental investments;

Traffic Offload. Offloading traffic from carrier networks, as does WiFi, further reducing carrier plant and operations expenditure requirements.

In some embodiments, the above-described advantages as well as other advantages are realized through a network of communications devices, where an individual network device comprises: (i) one or more processors: (ii) at least one private wireless network interface configured for communicating via a private wireless wide area network (WAN); (iii) at least one private wireless signaling network interface; and (iv) tangible, non-transitory computer-readable memory comprising instructions stored therein.

In operation, an individual network device is configured to perform functions comprising: (i) for the private wireless WAN, maintaining a private network routing table implemented via a permissioned blockchain ledger updated via a private wireless signaling network, wherein the private network routing table comprises, for each node in the private wireless WAN one or more of (a) a geographic location of the node, (b) a network status of the node, or (c) a network capability of the node; (ii) in response to a requirement to transmit data to another network device, determining whether the other network device is reachable via the private wireless WAN based on the private network routing table; and (iii) in response to determining that the other network device is reachable via the private wireless WAN based on the private network routing table, transmitting the data to a node in the private wireless WAN via the at least one private wireless network interface for delivery to the other network device via the private wireless WAN.

These and other aspects of the technical solutions disclosed herein enable a peer-to-peer self-organizing mobile network. While some examples described herein may refer to functions performed by given actors such as "users" and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number typically refers to the Figure in which that element is first introduced. Many of the details, dimensions, and other features shown in the Figures are merely illustrative of particular embodiments of the disclosed technology. Accordingly, other embodiments can have other details, dimensions, and features without departing from the spirit or scope of the disclosure. In addition, those of ordinary skill in the art will appreciate that further embodiments of the various disclosed technologies can be practiced without several of the details described below.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustration, and variations, including different and/or additional features and arrangements thereof, are possible.

DETAILED DESCRIPTION

Figure 1:
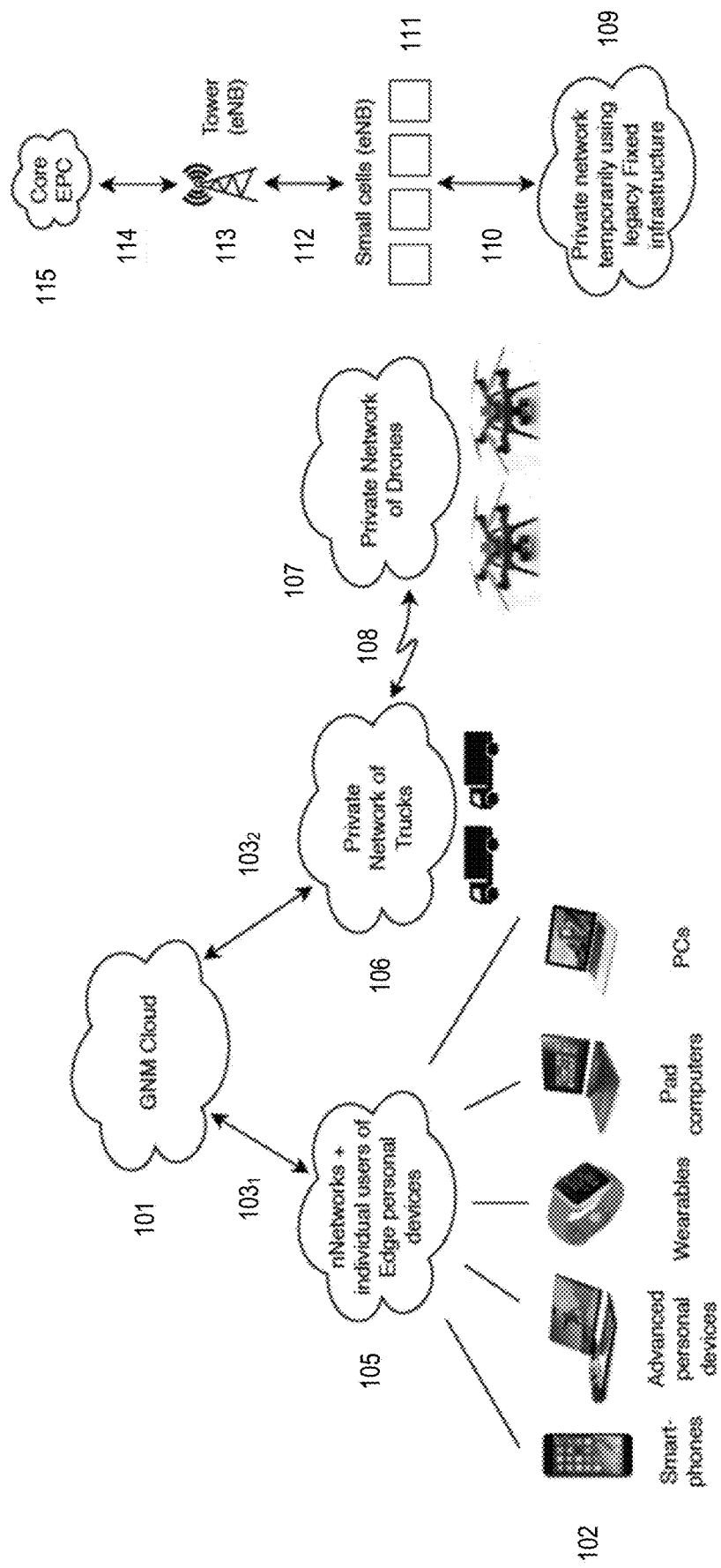
FIG. 1 shows aspects of a mobile mobile network architecture according to some embodiments.

Embodiments disclosed herein provide a system comprising hardware and/or software to enable individuals, companies, or other organizations to communicate with each other and to form networks under their control. In some embodiments, hardware components can be added to mobile devices, such as smartphones and other computing platforms, and related software is downloadable to mobile devices or other platforms. Some embodiments also include a Global Network Manager (GNM) to provide increased effectiveness and efficiency of network operations, as described herein.

In some embodiments, a peer-to-peer self-organizing mesh network includes at least one Master Peer and/or a device referred to herein as an Ultrex.

The Master Peer downloads a software application (which in some embodiments may be a Mobile dApp (decentralized application)) to a device, which may include any iOS, Android or Open Source based device, or any other type of wireless device now known or later developed.

The Master Peer(s) may be a mobile modality of any type that has an Ultrex device affixed to it or at least communicatively coupled thereto via a wireless or wired communications link. In some embodiments, a Master Peer has attached a smaller case, or downloaded software, providing the equivalent capabilities of an Ultrex device. The primary features and capabilities of an Ultrex are described herein.

Communications devices according to some embodiments are configured to operate in peer-to-peer networks comprising large numbers of mobile transport vehicles (as well as drones or other airborne objects, as well as robots and other terrestrial objects). In some embodiments, any group wishing to establish a network can download the dApp to a device, creating a Master Peer, and then attach (or otherwise connect) the Ultrex device to at least one Peer device. In operation, an Ultrex is configured for interoperation with a vast range of UE (user equipment) devices. In some embodiments, the acceptance and policies of these UEs are determined by the Master Peer.

Some embodiments include, upon initialization, a Master Peer receiving a unique network identifier for conducting telecommunications types of services. Some embodiments also include a ledger of all users who have enrolled to use a particular network. In some embodiments, the ledger comprises a blockchain ledger. However, other types of ledger implementations could be used as well. For some embodiments that include a blockchain ledger of users, upon initialization the Master Peer receives a set of blockchain/smart contract identifiers for asset management services. After receiving the set of blockchain/smart contract identifiers for asset management services, the Master Peer pairs with one or more Ultrex devices to establish the initial network and blockchain identifiers, or other ledger information. In some embodiments, the ledger of all users who have enrolled to use a particular network takes the form of a routing table The Master dApp in some embodiments performs one or more of at least four primary functions:

I. System Administration and Management.

In some embodiments, the Master dApp is configured to perform one or more of the overall system administration and management of the Master (client/owner), its paired community of Ultrex devices, and the Master's relationship to other Masters. The relationship among Masters and their respective Ultrex devices and user devices is a Peer to Peer one. Therefore, the management and governance of this relationship is preferably (but not necessarily) based on a consensual decision process, which could be implementable over a wide range of peer to peer networks, Masters/Ultrex partners. Some embodiments utilize a Blockchain, permissioned software architecture to realize this peer to peer consensual relationship. In the contemplated use of the blockchain, these relationships are established and authenticated by a separate blockchain base of identifiers, in order to establish trusted affinity groups. A master and associated Ultrex devices may be a member of many other networks each with a distinctive block chain set of identifiers. Each of these aforementioned networks may be dark (or unknown) to any or all other networks. In some embodiments, individual affinity groups may participate in a private wide area network comprising communication devices configured to implement the features and functions disclosed herein. In some embodiments, a single commercial enterprise may deploy and operate a private wide area network comprising the communication devices configured to implement the features and functions disclosed herein.

II. Radio Resource Determination

In some embodiments, the Master dApp determines which radio access network (RAN) resources, if any, of an Ultrex are suited for a given application, communication session, or other operation. And in some embodiments, after determining which RAN resources to use for a particular application, communication session, or other operation, the Master dApp (or the communications device on which the Master dApp is running) transmits data for the application, session, or operation via a radio interface corresponding to the RAN resources determined to be suitable for the application, session, or operation.

III. Establishing and Maintaining the Ledger

In some embodiments, the dApp additionally establishes and/or maintains, with available Ultrex CPU and memory resources, the blockchain based virtual asset ledgers and associated smart contracts (or corresponding data if other than a blockchain ledger is employed). In some embodiments, the blockchain based virtual asset ledger comprises a routing or forwarding table of network devices and information related thereto, including but not limited to, for an individual network device, one or more of (i) the geographic location of the network device, and/or (ii) communications capabilities of the network device, e.g., interface types, reachable networks, networking and/or transmission protocols, quality of service capabilities, and/or other capabilities or aspects.

IV. Establishing and Maintaining Network Management Systems

In some embodiments, the dApp additionally establishes and/or maintains the network management systems for the Master's established Networks; including the topology, choice of mesh or direct networking options, networks assets, status conditions and major performance metrics of the Master's networks. This may include, by way of example and not limitation, roaming status with other Master (peer) networks, billing and charging arrangements and quality of service metrics, and administrative controls. In some embodiments, or more of the topology, mesh or direct network options, network assets, status conditions, performance metrics, roaming status, billing and charging arrangements, metrics, and/or administrative controls may be stored in a blockchain-based ledger or other type of ledger or database.

In some embodiments designed for use in mobile transport vehicles (vehicles which can carry persons or things), or in other portable things, such as drones or robots, the major features of the Ultrex device include one or more of the following:

Implementing one or more capabilities of a small mobile cell site (eNB); some embodiments additionally implement one or more Evolved Packet Core (EPC) network features.

The Ultrex in some iterations comprises a Virtual Mobile Network Site (VMNS). In some embodiments, the Ultrex is approximately the size of a Netbook/iPad. In some embodiments, the Ultrex may be approximately the size of a mobile phone. In further embodiments, the Ultrex may be smaller than a mobile phone. These Ultrex devices have both a standard radio access network for licensed spectrum on the 3GPP standard and the capability of using one or more of a variety of other licensed and unlicensed spectrum options, including but not limited to one or more of: CBRS (citizens broadband radio service); Bluetooth Mesh; ZigBee; LPWAN (low power wide area network, such as LoRaWAN); DSRC (dedicated short range communications); 802.11ax; Low Band (under 400 Mhz); Marine VHF/UHF; and/or satellite communications. Some embodiments additionally or alternatively include APIs (application programming interfaces) relating to any one or more (or all) of the above-listed licensed and unlicensed network options.

In some embodiments, an Ultrex communicates to other designated Ultrex devices by optimally determining Mesh or direct communications paths. This determination is made by preloaded software in the Ultrex. In some embodiments, an Ultrex determines communications paths from a source to a destination (which may be an external network interface) via reference to a routing and/or forwarding table.

In some embodiments, software updates to the Ultrex are done from the Master.

It should be noted that the exact form factor of the Ultrex can be adapted to suit the type of vehicle, or other object, that it might be attached to or otherwise communicatively coupled to, e.g., via a wired or wireless connection. Thus, by way of example, an Ultrex intended for use with a motor car or truck may differ in size and other aspects from an Ultrex intended for use with a bicycle.

In some embodiments designed for use with mobile devices, such as smartphones, tablet computing devices, wearable mobile devices and others, the capabilities of the Ultrex may be embodied in a small case, which may be attachable to, or used in close proximity to, a given mobile device.

In some embodiments designed for use with mobile and other devices, the capabilities of the Ultrex, and/or the Master, may be embodied in software (individually or in combination with associated hardware and/or other components), incorporated in, or downloaded to and executed at least in part by, the mobile device. In other embodiments, the Ultrex and/or the Master may be modified and affixed to, or incorporated into, IoT (Internet of Things) devices and objects.

Various embodiments disclosed herein enable communications among an almost limitless number of different networks, that may include varied numbers of users, and may involve different modalities (e.g., any type of transport vehicle; any type of mobile user device; other devices and objects), and communications between networks of differing modalities (e.g., between mobile device networks and boat networks) and will accommodate future types of modalities and devices.

In some embodiments, the above-mentioned blockchain ledger is an internally developed, proprietary, permissioned, blockchain. In some embodiments, when users join the private network (and download the blockchain ledger, or at least portions thereof), a user can elect the degree to which they wish to share their personal information with other blockchain members and the degree to which they wish to receive information about other members and other networks. If they elect, the blockchain ledger will enable users to: track networks and/or communications devices that they are authorized to use; identify other networks that they might wish to attempt to join; and share resources with other networks or network members—all in a highly secure setting.

In some embodiments, the blockchain facilitates sharing, trading, and/or bartering of real and virtual assets in a trusted environment. In some embodiments, the blockchain additionally encompasses functionality for tracking network resource sharing exchanges and for facilitating billing for, or trading of, these resources among users.

In some embodiments, the blockchain will handle or at least support the handling of OSS (operations support service) type activities.

OSS activities include management functions, such as functions for network inventory, service provisioning, network configuration, and fault management. In some embodiments, communications devices will be able to transpose network KPIs (key performance indicators) into the blockchain and integrate location-based services with network readings.

In some embodiments, the disclosed systems and methods enable "best efforts" quality of communications. In some embodiments, to provide increased effectiveness and efficiency of network operations, the disclosed systems and methods include a Global Network Manager (GNM) capability. In operation, the GNM will have the capability for oversight of a full range of networks and users on a global scale, or at least on a very large scale. The GNM is not a necessary feature for basic communications among networks and users, and in some embodiments, the GNM may be offered under a software-as-a-service (SaaS) model for subscribing users, or under other terms.

Some advantages of the GNM implemented in connection with some embodiments include, among other advantages:

Effectiveness: 1. Identifies best network(s) to connect to; 2. Identifies best ways to connect; 3. Offers enhanced QoS (quality of service) capabilities; 4. Provides best SLA (service level agreement) fit to a user's needs.

Efficiency: 1. Improves/optimizes communication/networking asset utilization; 2. Enhances security; 3. Improves traffic—mbs/throughput/time—dependencies; 4. Provides increased scalability; 5. Lowers costs.

Some embodiments may additionally realize heuristic benefits gained by the interaction of the GNM and the client Ultrex devices, (or Ultrex equivalents) as each develops a history of interaction.

The design of the GNM in some embodiments will permit creation of an emergency network overlay, which may be included in some embodiments, to assist other emergency service options or other cross-industry vertical services.

FIG. 1 shows aspects of a mobile mobile network (MMN) architecture according to some embodiments. The architecture of FIG. 1 includes a GNM Cloud 101 connected via links 103$_1$ and 103$_2$ to multiple networks, including a network 105 of individual users of edge personal devices 102 and a private network 106 of vehicles (e.g., trucks). The private network 106 is also connected via link 108 to a private network 107 of drones.

The edge personal devices 102 may include any type of networked communication device now known or later developed, such as smartphones, advanced personal devices, wearables, pad computers, PCs (and any other personal device that may be offered). Some of the devices 102 (as well as any vehicle) contain circuitry (e.g., SOCs—systems on a chip) and/or software embodying and/or implementing one or more of the eNB (cell site), EPC (evolved packet core) features, and the full other features of Virtual Mobile Network Sites (VMNSs) including embodying the capabilities of the controlling entity (which in some embodiments is or at least comprises the Master).

The network 105 of individual users may in some embodiments comprise many separate networks, each defined by the part of the software stack integrated into the appropriate personal device 102 which represents the controlling entity (or Master). These networks 105, (and/or users of these networks 105) can elect, through their controlling entities to communicate to the Global Network Manager (GNM), 101 via links 103$_1$ and 103$_2$. In some embodiments, the GNM 101 can add Effectiveness and Efficiency to communications among the networks 105, however, it is not required for basic communications among the networks 105 or the edge devices 102 connected thereto.

FIG. 1 also depicts a private network 106 of Trucks and a private network 107 of drones. These two networks 106 and 107 are communicating, cross-modalities, 108 (e.g., by mesh technology). Links, including, but not limited to 103 and 108 may be implemented via several communications protocols across several spectrum bands. The Truck network 206 is communicating with the GNM 101, but the Drone network is assumed not to have elected to use the advanced features of the GNM 101, so it is shown not communicating with the GNM 101.

FIG. 1 also shows a private network 109 that is part of the MMN but is temporarily communicating using legacy Fixed Network infrastructure. This infrastructure includes Small Cells 111 with eNB (cell site) capability with communication links 110 (e.g., fiber, microwave); Towers (also cell sites) 113 and appropriate links 112; and links 114 to the Network Core (EPC) 115.

Figure 2:
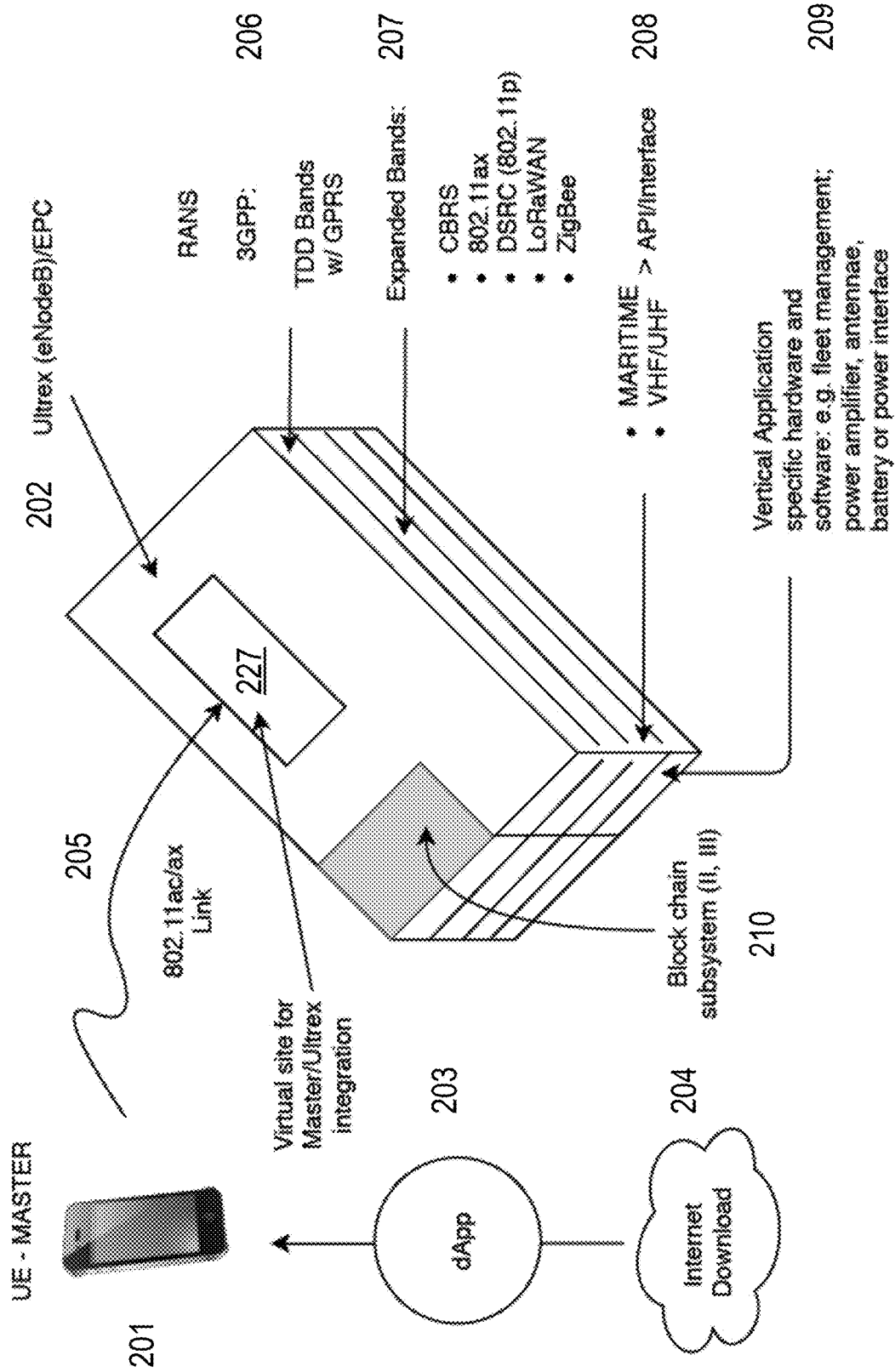
FIG. 2 shows aspects of a communications device according to some embodiments.

FIG. 2 shows aspects of a communications device according to some embodiments. The drawing illustrates the pairing of a "master" 201 with an initial Ultrex 202. The master 201 downloads the dApp 203 from the Internet 204. In some embodiments, the master 201 is a UE (user equipment). The master 201 communicates with the Ultrex 202 wirelessly, via, for example, an 802.11ac/ax link 205. The Ultrex 202 contains or is at least configured to implement one or more eNB and EPC capabilities. The layers or tiers 206-210 shown in FIG. 2 are representational rather than physical layers. Each layer or tier 206-210 identifies specific software and/or hardware elements of the Ultrex 202.

These layers or tiers 206-210 include and/or implement: communication capability with different spectrum bands 206, 207 and 208; vertical application-specific hardware and/or software 209; and blockchain subsystems 210.

Reference to LoRaWAN in the Expanded Bands is used in parts of this disclosure to signify other versions of LPWAN technology and networks as well, that can be used as appropriate to availability, location, and other factors. The diagram also shows the representation of a virtual site 227, shown within the Ultrex 202, for Master/Ultrex integration, in situations in which it is required and/or preferred.

Figure 3:
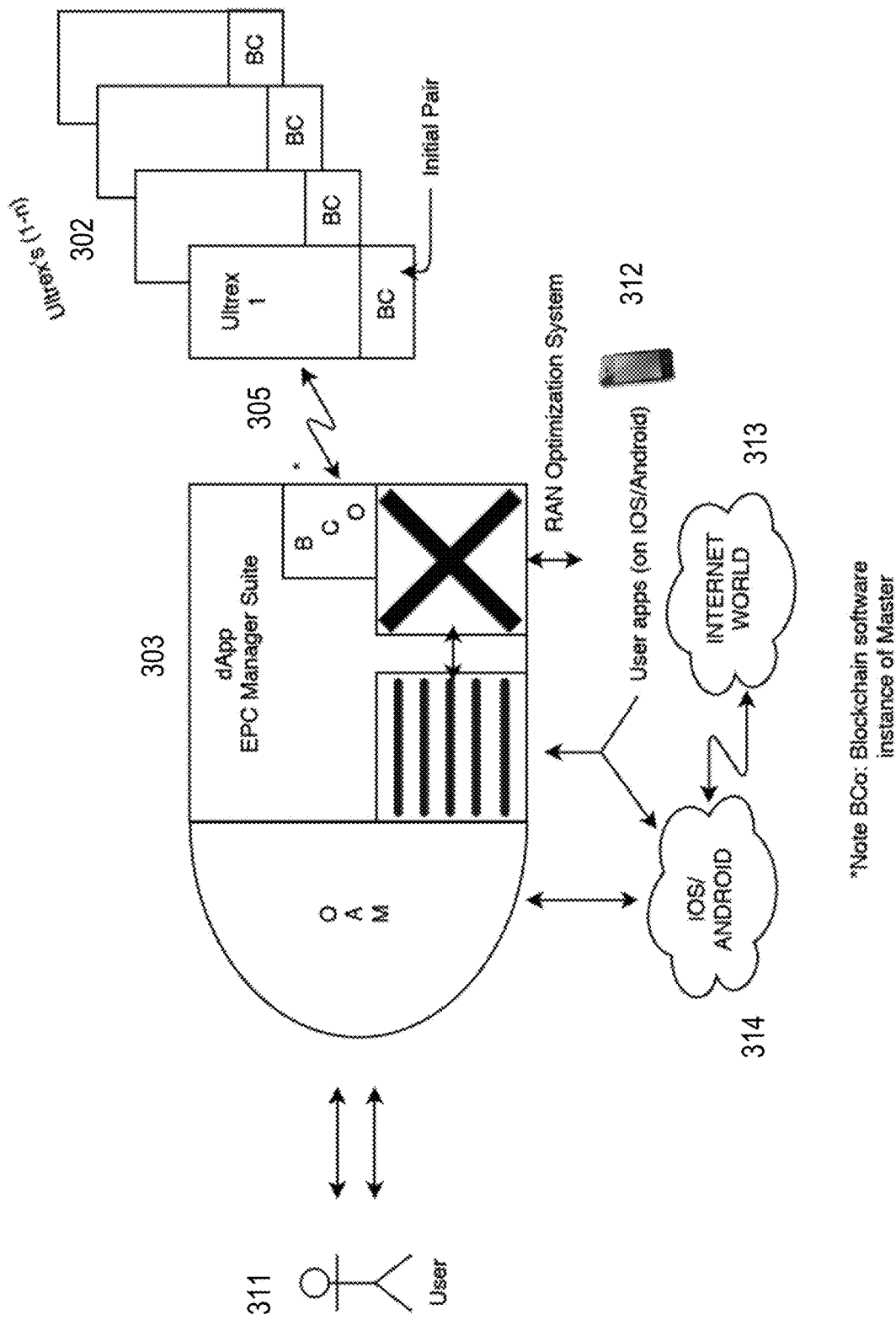
FIG. 3 shows aspects of a decentralized application according to some embodiments.

FIG. 3 shows aspects of a decentralized application according to some embodiments.

FIG. 3 shows the dApp 303 which is downloadable to Android or iOS devices for use by a user 311 (or by a communications device operated by the user 311). In some embodiments, the features of the dApp 303 include one or more of: the OAM (organization, administration and maintenance) module; as well as the EPC manager suite; the RAN optimization system; and the blockchain software instance (BCo) on the Master. FIG. 3 illustrates a Master communicating with Ultrex devices 302 via communications link(s) 305 for maintenance of the blockchain ledger and functions, as well as for RAN optimization. FIG. 3 also shows user apps 312, downloadable from the Internet 313 to user devices, typically iOS- or Android-based devices 314. In operation, the devices 314 could be any mobile communications device now known or later developed.

Figure 4:
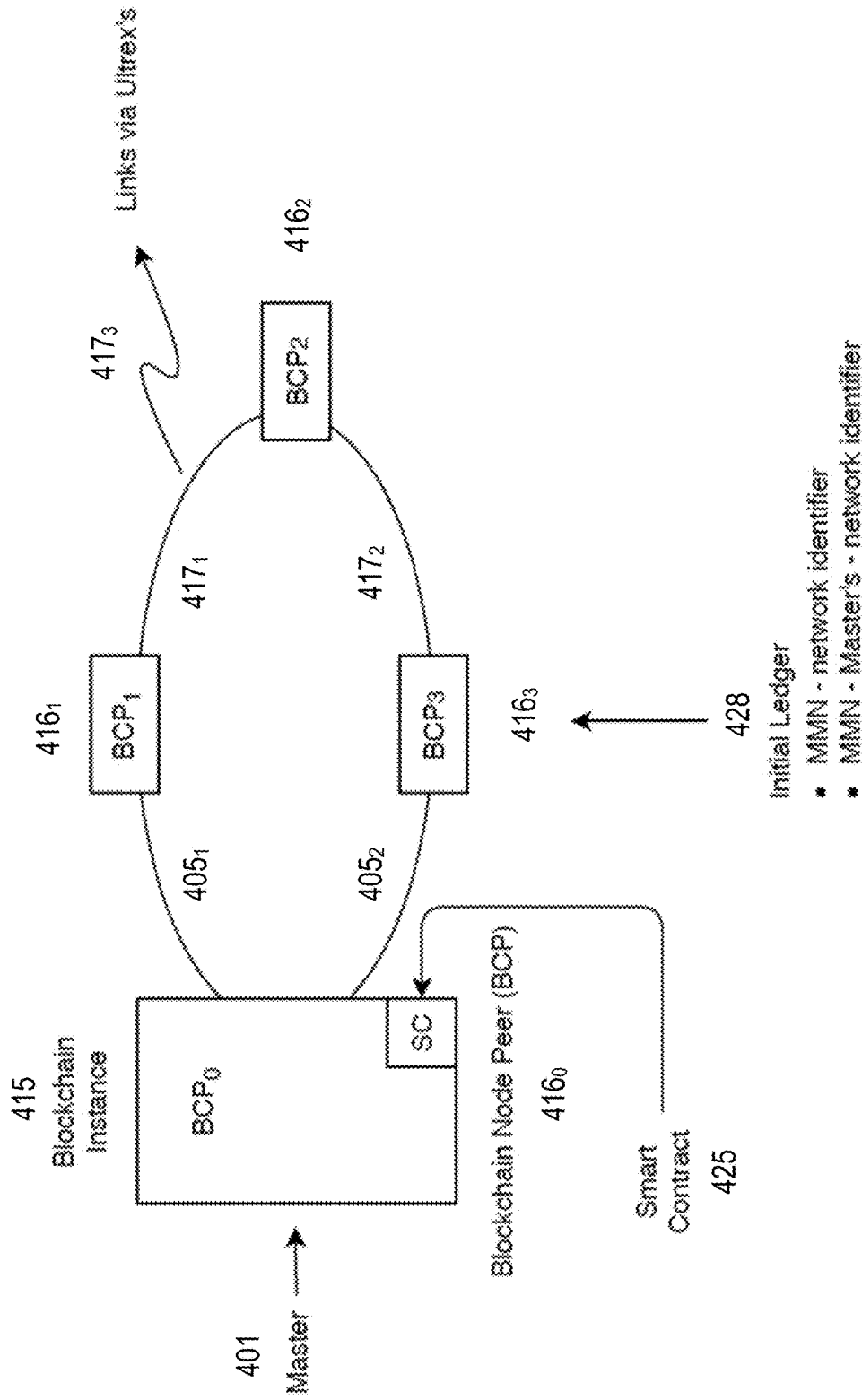
FIG. 4 shows aspects of establishing a virtual network according to some embodiments.

FIG. 4 shows aspects of establishing a virtual network according to some embodiments.

FIG. 4 illustrates a Master 401 and a blockchain instance 415, which represents a BCP (Blockchain Peer) $416_0$. The BCP $416_0$ includes one or more Smart Contracts (SC) 425. The SCs 425 are open to authorized participating nodes and/or masters. The BCP $416_0$ communicates with other BCPs $416_{1-3}$ via communication links $405_{1-2}$ and/or $417_{1-3}$. In operation, the other BCPs $416_{1-3}$ may be associated with other Masters. In some embodiments, the BCPs $416_{1-3}$ are Ultrex devices or Ultrex/Master devices. The initial ledger 428 contains identifiers that identify who is a member of the initial network.

Figure 5:
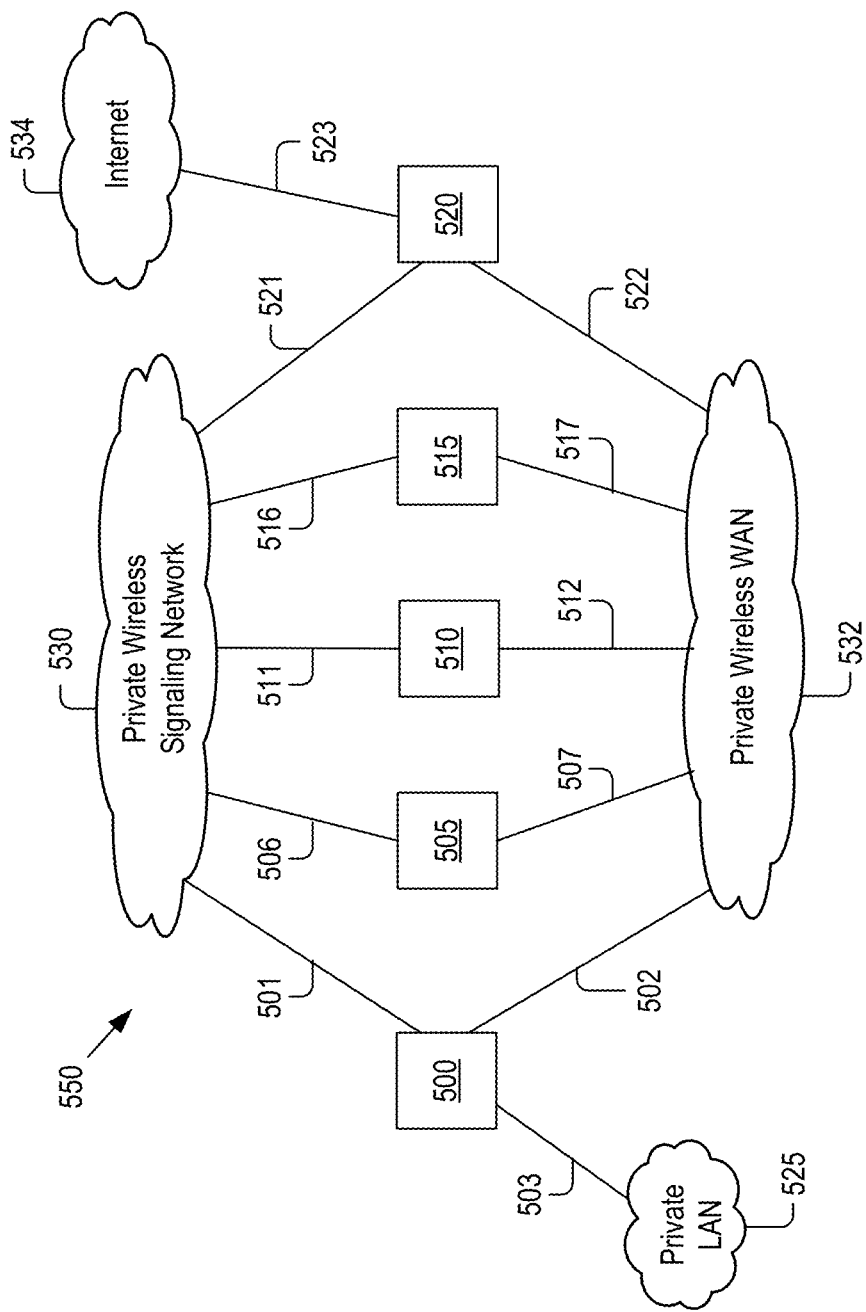
FIG. 5 shows aspects of communications devices configured for operation in a peer-to-peer self-organizing mobile network according to some embodiments.

FIG. 5 shows aspects of a network of communications devices configured for operation in a peer-to-peer self-organizing mobile network 550 according to some embodiments.

Network 550 in FIG. 5 shows communications devices 500, 505, 510, 515, and 520. Although only five communications devices are shown, in operation, network 550 may include many more than five communications devices. In some embodiments, any (or all) of the individual communications devices 500, 505, 510, 515, and 520 (and any other communications devices in the network) may comprise an Ultrex device, be connected to an Ultrex device, and/or be configured to perform one or more features of an Ultrex device disclosed herein. Further, any one or more of the communications devices 500, 505, 510, 515, and 520 (and any other communications devices in the network) may comprise a Master node, be connected to a Master node, and/or be configured to perform one or more features of a Master node disclosed herein.

Individual communications devices of the network devices 500, 505, 510, 515, and 520 may be any of the communications devices disclosed herein, such as a smartphone, tablet computer, a vehicle (car, truck, boat, drone) on-board computer, a sensor device, or any other mobile communications device now known or later developed. In some embodiments, one or more of the communications devices 500, 505, 510, 515, and 520 comprises or is communicatively coupled to an Ultrex device. In some embodiments, one or more of the communications devices 500, 505, 510, 515, and 520 comprises software configured to perform one or more functions of the Ultrex devices disclosed herein.

In example network 550, the communications devices 500, 505, 510, 515, and 520 are configured to communicate with each other via a private wireless wide area network (WAN) 532 based at least in part on signals transmitted and received via the private wireless signaling network 530. In operation, each of the communications devices may source and transmit data to other communications devices via the private wireless WAN 532 and/or the Internet 534, route data traffic received from one communications device to another communications device via the private wireless WAN 532 and/or the Internet, and/or receive data from another communications device via the private wireless WAN 532 and/or the Internet 534.

In some embodiments the private wireless signaling network 530 is separate from the private wireless WAN 532. In some embodiments, the private wireless signaling network 530 is implemented via the private wireless WAN 532. In some embodiments, portions of the private wireless signaling network 530 are implemented separate from the private wireless WAN 532 and other portions of the private wireless signaling network 530 are implemented via the private wireless WAN 532. In some embodiments, portions of the private wireless signaling network 530 may be implemented via the Internet 534 via virtual private network (VPN) or similar techniques.

In some embodiments, the private wireless WAN 532 is separate from public communications networks, such as commercial cellular data networks, other public wireless networks, and/or the Internet 534. In some embodiments, portions of the private wireless WAN 532 are separate from public communications networks while other portions of the private wireless WAN are implemented via one or more public communications networks.

In some embodiments, the private wireless WAN 532 comprises multiple separate wireless networks. Further, some parts of the private wireless WAN 532 may implement different wireless protocols than other parts of the private wireless WAN 532. For example, in some embodiments, the private wireless WAN 532 comprises and/or is configured from one or more (i) cellular data networks and/or links, (ii)

WiFi networks and/or links, (iii) Bluetooth networks and/or links, (iv) Low Power Wide Area Networks (LPWAN) and/or links, (v) Narrow Band IoT (NB-IoT) networks and/or links, (vi) Zigbee networks and/or links, and/or (vii) Dedicated short-range communications (DSRC) networks and/or links. Other wireless networks and/or wireless network links could be used as well.

Each of the communications devices 500, 505, 510, 515, and 520 of example network 550 includes one or more processors, a plurality of wireless communications interfaces, and tangible, non-transitory computer-readable media comprising instructions stored therein, wherein the instructions, when executed by the communications device's one or more processors, cause the communications device to perform one or more of the features and functions disclosed herein.

In operation, each of the communications devices 500, 505, 510, 515, and 520 of example network 550 are configured to communicate with each other via the private wireless WAN 532 based on signaling data transmitted and received via the private wireless signaling network 530.

Some (or perhaps all) communications devices may additionally operate as gateways between the private wireless WAN 532 and the Internet 534 for the purpose of routing data between the private wireless WAN 532 and the Internet 534. For example, communications device 520 is connected to the Internet 534 via communications link 523. Some (or perhaps all) of the other communications devices 500, 505, 510, and 515 may also have Internet connections (not shown).

Some communications devices may additionally operate as gateways between the private wireless WAN 532 (and/or the Internet 534) and a private LAN for the purpose of routing data between the private wireless WAN 532 and a private LAN. For example, communications device 500 is connected to private LAN 525 via communications link 503. Some (or perhaps all) of the other communications devices 505, 510, 515, and 520 may also have local LAN connections (not shown). In some embodiments, local LAN connection(s) at a communications device may connect the communications device to any one or more of (i) a local WiFi network, (ii) an on-board diagnostic computer in a vehicle, (iii) an on-board navigation system of a vehicle, (iv) an on-board entertainment system of a vehicle, (v) a network of vehicle on-board sensors, (vi) an inventory management system, and/or (vii) any other type of local network and/or types of devices connected thereto now known or later developed.

Communications device 500 is connected to the private wireless signaling network 530 via wireless link 501. Wireless link 501 can be implemented via any type of wireless transmission scheme now known or later developed. Communications device 500 is connected to the private wireless WAN 532 via wireless link 502. In embodiments where the private wireless signaling network 530 is implemented via the private wireless WAN 532, wireless links 501 and 502 may be separate virtual links over a common physical communications link. Communications device 500 may also be connected to the Internet 534 (not shown). Communications device 500 is also connected to private LAN 525 via communication link 503 as described above.

Communications device 505 is connected to the private wireless signaling network 530 via wireless link 506. Wireless link 506 can be implemented via any type of wireless transmission scheme now known or later developed. Communications device 505 is connected to the private wireless WAN 532 via wireless link 507. In embodiments where the private wireless signaling network 530 is implemented via the private wireless WAN 532, wireless links 506 and 507 may be separate virtual links over a common physical communications link. Communications device 505 may also be connected to the Internet 534 (not shown). Communications device 505 may also be connected to one or more private LANs and/or other local devices via one or more local communication links (not shown).

Communications device 510 is connected to the private wireless signaling network 530 via wireless link 511. Wireless link 511 can be implemented via any type of wireless transmission scheme now known or later developed. Communications device 510 is connected to the private wireless WAN 532 via wireless link 512. In embodiments where the private wireless signaling network 530 is implemented via the private wireless WAN 532, wireless links 511 and 512 may be separate virtual links over a common physical communications link. Communications device 510 may also be connected to the Internet 534 (not shown). Communications device 510 may also be connected to one or more private LANs and/or other local devices via one or more local communication links (not shown).

Communications device 515 is connected to the private wireless signaling network 530 via wireless link 516. Wireless link 516 can be implemented via any type of wireless transmission scheme now known or later developed. Communications device 515 is connected to the private wireless WAN 532 via wireless link 517. In embodiments where the private wireless signaling network 530 is implemented via the private wireless WAN 532, wireless links 516 and 517 may be separate virtual links over a common physical communications link. Communications device 515 may also be connected to the Internet 534 (not shown). Communications device 515 may also be connected to one or more private LANs and/or other local devices via one or more local communication links (not shown).

Communications device 520 is connected to the private wireless signaling network 530 via wireless link 521. Wireless link 521 can be implemented via any type of wireless transmission scheme now known or later developed. Communications device 520 is connected to the private wireless WAN 532 via wireless link 522. In embodiments where the private wireless signaling network 530 is implemented via the private wireless WAN 532, wireless links 521 and 522 may be separate virtual links over a common physical communications link. Communications device 520 is also connected to the Internet 534 as described above. Communications device 520 may also be connected to one or more private LANs and/or other local devices via one or more local communication links (not shown).

In some embodiments, each of the communication devices 505, 520, 515, and 520 in the example network 550 maintains a private network routing table implemented via a permissioned blockchain ledger updated via the private wireless signaling network 530.

In operation, the private network routing table comprises, for each communications device connected to the private wireless WAN 532 (i) a geographic location of the communications device, (ii) a network status of the communications device, and/or (iii) a network capability of the communications device.

Each communication device's geographic location may include one or more of (i) a location based on the communication device's global positioning system (GPS) coordinates, (ii) a location based on public or private WiFi networks that the communications device can detect (or is perhaps connected to), (iii) a location based on public cellular data network towers the communications device can detect (or is perhaps connected to), (iv) any other location determination mechanism now known or later developed, and/or (v) any combination thereof.

Each communications device's network status may include one or more of (i) a current processing load of the communications device, e.g., based on how many computing processes the communications device is currently running and/or how much processing power the communications device has made or can make available to other communications devices for processing network-based applications, (ii) a current networking load of the communications device, e.g., based on utilization of the communications device's network interfaces, (iii) an online or offline indication, (iv) an indication that the communications device is in a maintenance mode, (v) an indication that the communications device is operating with reduced processing and/or networking capabilities, (vi) any other network status now known or later developed, and/or (vii) any combination thereof.

Each communication device's network capability (or capabilities) may include one or more of (i) each type of communications interface available to route data via the private wireless WAN 532 and/or the Internet 534, (ii) a current utilization of each communications interface available to route data via the private wireless WAN 532 and/or the Internet 534, (iii) the networking and/or transmission protocols supported by the communications device, (iv) any other networking capability now known or later developed, and/or (v) any combination thereof.

As mentioned previously, all the network devices in the network 550 maintain a private network routing table (or similar database) implemented via a permissioned blockchain ledger updated via the private wireless signaling network 530. In operation, each communications device updates the private network routing table by (i) transmitting routing table updates via the private wireless signaling network 530 to all the other communications devices configured to receive routing table updates via the private wireless signaling network 530, and (ii) receiving routing table updates via the private wireless signaling network 530 from all other communications devices that are configured to transmit routing table updates via the private wireless signaling network 530. In this manner, the private network routing table is a decentralized routing table where all the communications devices authorized to connect to and route traffic within the private wireless WAN 532 transmit and receive routing updates to and from each other to maintain the routing table.

In embodiments that rely on the Open Shortest Path First (OSPF) routing protocol (and variants thereof), each communications device 500, 505, 510, 515, and 520 shares routing information with every other communications device, and each communications device 500, 505, 510, 515, and 520 maintains a copy of the OSPF Link-State Database (LSDB). Although an OSPF-based LSDB is described for illustrative purposes, the features and functions disclosed and described herein are equally applicable to other routing protocols, routing tables, and corresponding routing table information updates for applications where a secure and trusted routing table is required or at least desired by a network operator.

For example, other routing protocols could be used to learn routes and update routing tables accordingly, where routes may be based on transmission links that operate according to many different wireless transmission schemes (e.g., cellular data network links, WiFi network links, Bluetooth network links, Low Power Wide Area Network (LPWAN) links, Narrow Band IoT (NB-IoT) network links, Zigbee network links, Dedicated short-range communications (DSRC) network links, or other types of wireless networks and wireless network links now known or later developed. Similarly, network protocols for discovering the availability of physical wireless links and configuring physical wireless links over which data can be routed via the OSPF routing protocol (or other layer 3 protocols) that use similar network link databases could rely on the same or similar network database update techniques disclosed herein, e.g., implementing the network database (or at least portions thereof) in a permissioned blockchain and using smart contracts to implement updates to the network database (or portions thereof).

In operation, the LSDB is a representation of the topology of the private wireless WAN 532 (or perhaps OSPF area thereof), and the LSDB is how each communications device 500, 505, 510, 515, and 520 knows the state of the communications links 502, 507, 512, 517, and so on within the private wireless WAN 532. The LSDB stores data that is equivalent to a graphical picture showing the topology of the private wireless WAN 532 (or perhaps OSPF area thereof).

In some embodiments, the private wireless WAN 532 is or corresponds to an OSPF Autonomous system (AS), or perhaps an OSPF area of an OSPF AS. In network 550, each communications device 500, 505, 510, 515, and 520 functions as a router (or node) in the private wireless WAN 532. In operation, the private wireless WAN 532 may comprise many hundreds or thousands of communications devices (or nodes) configured to route data within the private wireless WAN 532. The OSPF LSDB is a table that summarizes the nodes and links connecting those nodes to allow each communications device in the private wireless WAN 532 (or perhaps OSPF area thereof) to maintain a virtual picture of all the connections between the communications devices within the private wireless WAN 532 (or perhaps OSPF area thereof), as well as other networks that connect to the private wireless WAN 532 (e.g., the Internet 534) and the other communications devices that can provide connections or routes to those other networks (e.g., communications device 520 providing a connection to the Internet 534).

The OSPF LSDB therefore indicates which communication devices can directly reach which other communications device, and also which outside networks each communications device can reach. Additionally, the OSPF LSDB stores for each of the links in the table, a cost to reach other communications devices, other OSPF areas of the private wireless WAN 532 (if applicable), and other external networks (e.g., other private wireless WANs operated by other entities/groups/companies and/or the Internet 532). In some embodiments, the cost is an arbitrary metric that can be set up based on any criteria important to the operator of the private wireless WAN 532, which may vary depending on the type of private wireless WAN implementation (e.g., terrestrial, air, maritime, hybrid terrestrial/maritime, and so on). In some embodiments, the cost may correspond to a simple hop-count metric similar to that used in Routing Information Protocol (RIP). In some embodiments, the cost may correspond to more sophisticated metrics, such as bandwidth availability, latency, jitter, radio transmission power required to transmit or receive data via a link, current congestion metrics, or other link or route costs now known or later developed. One or more of the cost metrics may be configured by the private wireless WAN operator. And one or more of the cost metrics may be updated by communications devices in real time or substantially in real time, or the cost metrics may be updated on a regular or semi-regular basis, e.g., a few times per second, a few times per minute, a few times per hour, and so on.

In embodiments that use OSPF routing (and variations thereof), building and maintaining the LSDB includes transmitting and receiving various types of messages, e.g., Hello, Database Description, Link State Request, Link State Update, Link State Acknowledgement, and perhaps other messages suitable for maintaining and updating an LSDB.

Hello (or similar) messages enable a communications device to discover other adjacent communications devices on its local links (directly connected links) within the private wireless WAN 532. The Hello messages establish relationships between neighboring communications devices (called adjacencies) and communicate key parameters about how OSPF is to be used in the private wireless WAN 532.

Database Description messages contain descriptions of the topology of the private wireless WAN 532. That is, they convey the contents of the LSDB for the private wireless WAN 532 (or perhaps OSPF area thereof) from one communications device to another. Sometimes, communicating a large LSDB may require several messages; this is done by having the sending device designated as a master device (at least for LSDB transmission) and sending messages in sequence, with individual recipients of the LSDB information responding with acknowledgements. After appropriate validation, individual communications devices update their copy of the LSDB with the information contained within the Database Description messages.

Link State Request messages are used by one communications device to request updated information about the LSDB (or perhaps a portion of the LSDB) from another communications device. In some embodiments, a Link State Request message specifies exactly which link(s) about which the requesting communications device wants more current information.

Link State Update messages contain updated information about the state of certain links within the LSDB. In operation, a communications device sends one or more Link State Update messages in response to one or more Link State Request messages from another communications device. Individual communications devices may also broadcast or multicast Link State Update messages to other communications devices via the private wireless signaling network 530 on a regular basis or semi-regular basis as their communications capabilities change (e.g., as new wireless links become available or as older wireless links are no longer available). The contents of these Link State Update messages are used to update the information in the LSDBs of the other communications devices that receive the Link State Update messages (after appropriate validation, as described herein).

Link State Acknowledgment messages provide reliability to the link-state exchange process, by explicitly acknowledging receipt of a Link State Update message.

At least some of the above-described messages (or at least some information contained within at least some of the above-described messages) are sent from one communications device to other communications devices within a block of a permissioned blockchain and implemented via a smart contract. For example, in some embodiments, the smart contract may require one or more Master communications devices to determine that an LSDB update is valid such that, in response to the one or more Master communications devices validating a block comprising information for an LSDB update, the LSDB is updated with the information contained within that (now validated) block. In other example embodiments, the smart contract may require some minimum number of other communications devices (Master or otherwise) to determine that an LSDB update is valid such that, in response to the minimum number of communications devices validating a block comprising information for an LSDB update, the LSDB is updated with the information contained within that (now validated) block. The LSDB (or at least the updated portion thereof) can now be pushed out to all other communications devices within the private wireless WAN 532.

Because the LSDB is implemented with a permissioned blockchain, the LSDB is maintained and controlled by the communications devices that participate in the private wireless WAN 532 (or perhaps OSPF area thereof). In some embodiments, each and every communications device validates each block comprising a potential LSDB update before that update can be recorded to the LSDB. In some embodiments, at least half of the communications devices must validate each block comprising a potential LSDB update before the update can be recorded to the LSDB. And in some embodiments, some predefined number (e.g., 20 communications devices) or percentage of communications devices (e.g., 30%) must validate each block comprising a potential LSDB update before the update can be recorded to the LSDB.

This feature results in a secure and trusted LSDB because every communications device participating in the private wireless WAN 532 acts independently of each another. In operation, requiring independent verification of LSDB updates by some (or perhaps all) of the communications devices prevents any unauthorized modification of the LSDB, or at least makes unauthorized modifications of the LSDB extraordinarily difficult. So, any hacker attempting to hijack the network by corrupting the LSDB, for example, would need to know how many communications devices must validate a block comprising an LSDB update and gain control of at least that number of communications devices to corrupt the routing capability of the private wireless WAN 532 and potentially steer data traffic away from its intended destination.

With a secure and trusted LSDB (or other routing table implementation), individual communications devices can make routing decisions about how to route packets from communications device to communications device through the private wireless WAN 532 based on the availability of routes, the cost of routes (based on the cost metrics disclosed herein or other cost metrics), and the radio network capabilities of the private wireless WAN 532 (or perhaps capabilities of different portions of the private wireless WAN 532).

In some embodiments, at least some (or perhaps all) communications devices in the private wireless WAN 532 are configured to delete old versions of the LSDB (or other routing table implementation) after some period of time (e.g., a certain number of minutes, hours, or days) after an update to the LSDB. In this manner, the entire history of the LSDB need not be stored at each communications device. Instead, only the most-recent history of the LSDB is stored at each communications device. In some embodiments, at least one communications device (e.g., a master communications or some other designated device), and perhaps multiple communications devices, may store the entire history of the LSDB, or perhaps a longer history of the LSDB than most other communications devices in the private wireless WAN 532.

Figure 6:
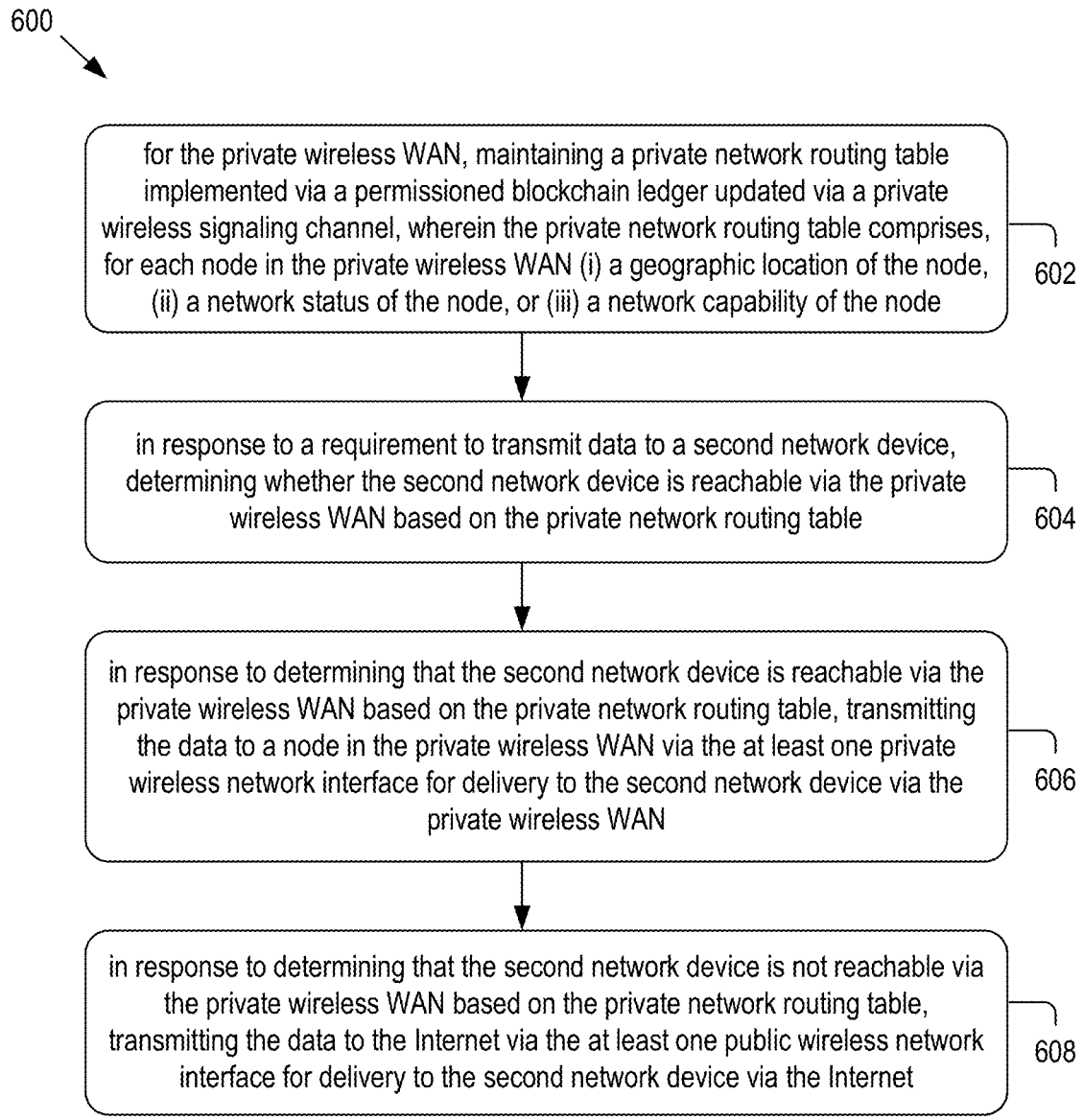
FIG. 6 shows aspects of a method of operating a communications device configured for operation in a peer-to-peer self-organizing mobile network according to some embodiments.

FIG. 6 shows aspects of a method 600 of operating a communications device configured for operation in a peerto-peer self-organizing mobile network according to some embodiments. The peer-to-peer self-organizing mobile network may be the same as or similar to any of the networks disclosed herein, including but not limited to network 550 shown in FIG. 5. And the communications device may be the same as or similar any of the communications devices disclosed herein, including but not limited to any of the communications devices 500, 505, 510, 515, and 520 show in FIG. 5.

Method 600 begins at step 602, which includes for a private wireless WAN, maintaining a private network routing table implemented via a permissioned blockchain ledger updated via a private wireless signaling network, wherein the private network routing table comprises, for each node in the private wireless WAN (i) a geographic location of the node, (ii) a network status of the node, or (iii) a network capability of the node. In some embodiments, the private wireless signaling network may be the same as or similar to private wireless signaling network 530 shown in FIG. 5. Accordingly, the private wireless signaling network may be separate from the private wireless WAN and the Internet or at least partially implemented via one or more of the private wireless WAN, one or more public wireless LANs, and/or the Internet.

In some embodiments, maintaining a private network routing table via a permissioned blockchain ledger comprises one or more of: (i) via the private wireless signaling network, receiving a new block for the blockchain ledger, the new block comprising an update to the private network routing table; determining whether the new block is valid; (ii) in response to determining that the new block is valid, executing an update to the private network routing table as a smart contract, and updating the permissioned blockchain ledger with the new block; and (iii) in response to determining that new block is invalid, discarding the new block.

In some embodiments, maintaining a private network routing table via a permissioned blockchain ledger additionally comprises: (i) determining whether a change has occurred in any one or more of (a) a geographic location of the first network device, (b) a network status of the first network device, or (c) a network capability of the first network device; and (ii) in response to determining that a change has occurred in any one or more of the first network device's geographic location, network status, or network capability, generating a new block comprising an indication of the change and broadcasting the new block to all nodes of the private wireless WAN via the private wireless signaling network.

Next, method 600 advances to step 604, which includes in response to a requirement to transmit data to a second network device, determining whether the second network device is reachable via the private wireless WAN based on the private network routing table.

Next, method 600 advances to step 606, which includes in response to determining that the second network device is reachable via the private wireless WAN based on the private network routing table, transmitting the data to a node in the private wireless WAN via the at least one private wireless network interface for delivery to the second network device via the private wireless WAN. In operation, the private wireless network interface may be a physical or a virtual private wireless network interface.

Next, method 600 advances to step 608, which includes in response to determining that the second network device is not reachable via the private wireless WAN based on the private network routing table, transmitting the data to the Internet via the at least one public wireless network interface for delivery to the second network device via the Internet. In operation, the public wireless network interface may be a physical or a virtual public wireless network interface.

Figure 7:
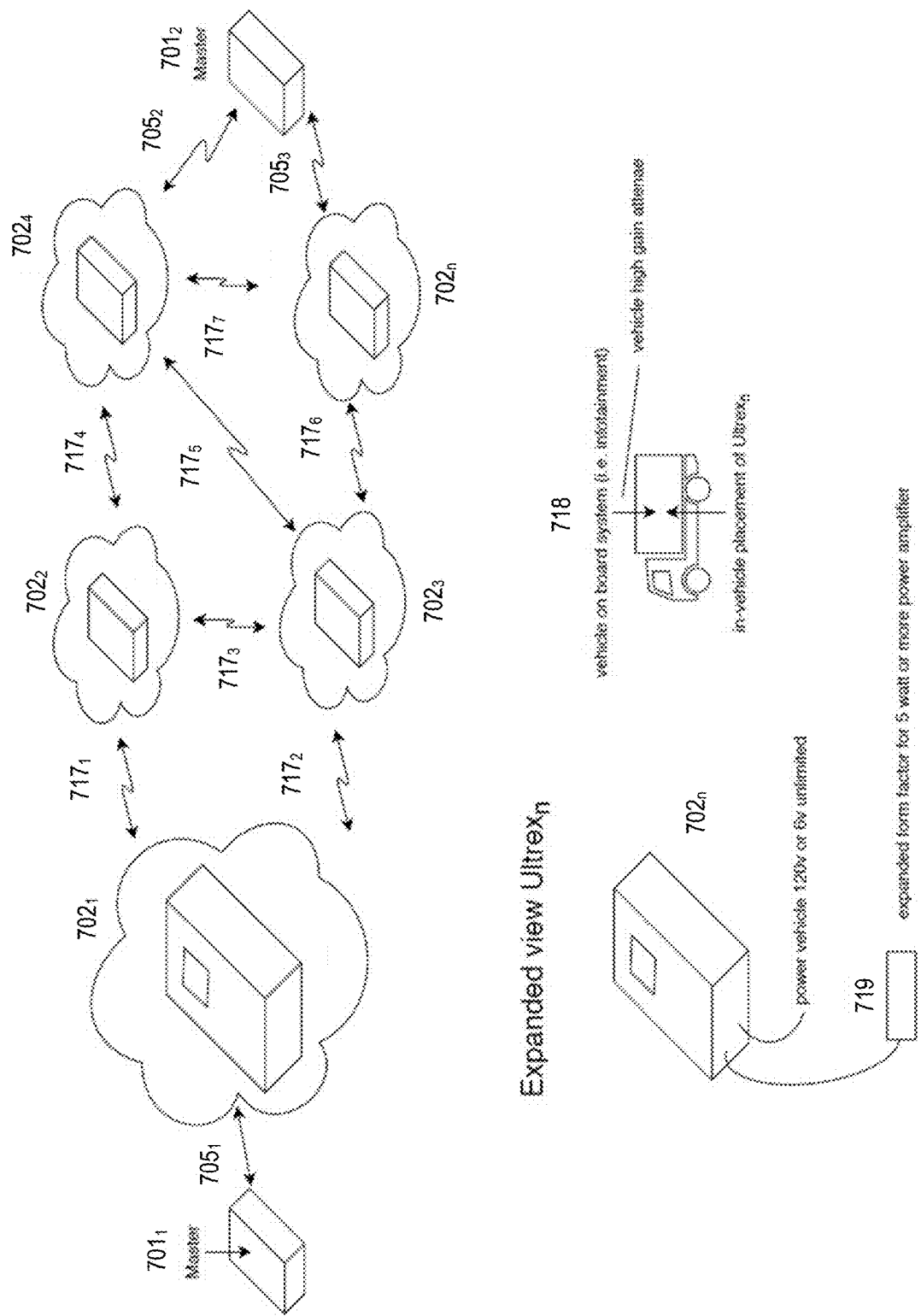
FIG. 7 shows aspects of a fleet management application according to some embodiments.

FIG. 7 shows aspects of a fleet management application according to some embodiments. FIG. 7 shows two Masters 701$_1$ and 701$_2$ communicating with initial Ultrex devices 702$_1$, 702$_4$, and 702$_n$ via communication links 705$_1$, 705$_2$, and 705$_3$, which communicate with Ultrex devices 702$_{2-n}$ that are placed within vehicles of a fleet (or other interacting group of vehicles.) There are direct or mesh links 717$_{1-7}$ used by the individual Ultrex devices 702$_1$, 702$_2$, 702$_3$, 702$_4$, and 702$_n$ to communicate with others. FIG. 7 also includes the representation of a vehicle (truck) 718 which has a high gain antenna attached thereto or incorporated therein and which has various on-board sensors and systems (e.g., an infotainment system). The Ultrex device in each truck is configured to communicate with these various on-board sensors and/or systems.

FIG. 7 also illustrates placement of an Ultrex 702$_n$ within the vehicle 718. Due to the inherent electrical power systems and other resources normally available in various mobile modalities, i.e. cars, trucks, boats, trains, planes (drones), the Ultrex family of products will have capabilities which can benefit from these resources. A primary example would be the power amplifiers 719 in the Ultrex devices 702$_n$ for trucking use could be in the 5 watt or above range; marine applications could be in the 10 watts or greater range.

Figure 8:
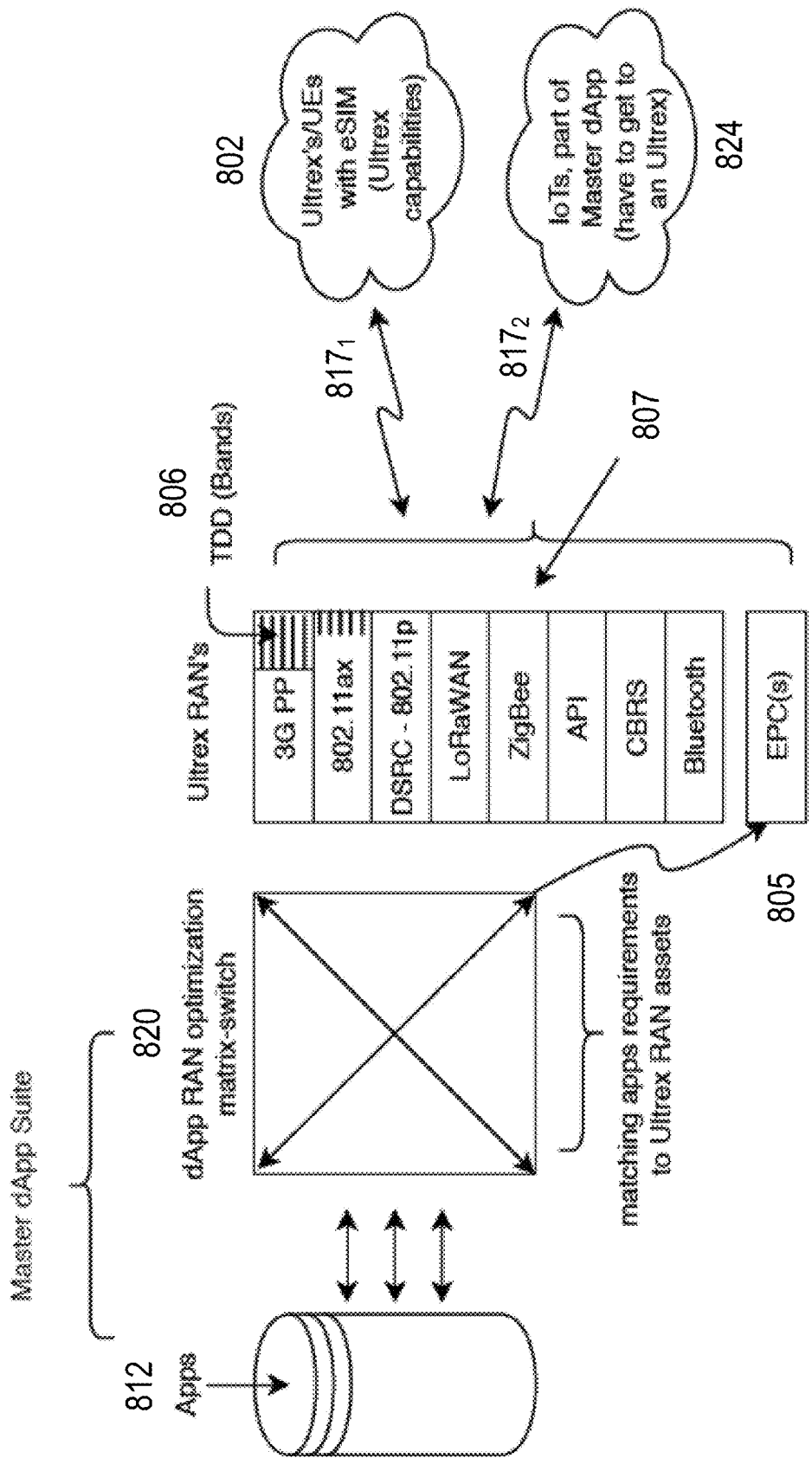
FIG. 8 shows aspects of matching network capabilities to communications requirements according to some embodiments.

FIG. 8 shows aspects of matching network capabilities to communications requirements according to some embodiments. FIG. 8 illustrates the "RAN Optimization System, (or Matrix)" 820, which in some embodiments is or comprises a switch.

In some embodiments, this Matrix 820 is part of the Master dApp software suite. The Matrix 820 receives inputs from Apps 812. These Apps may be web applications, or other tasks that the user wishes to use. The Matrix 820 matches the transmission requirements of these Apps to the RAN (radio access network) assets 806, 807 available to the Ultrex. The RAN assets include a wide range of alternative transmission technologies, (Expanded Bands) 807 as well as the possible use of the TDD bands (legacy carrier bands) 806. In the example embodiment shown in FIG. 8, elements of the EPC 805 are contained in the Ultrex (and the EPC is illustrated at the bottom of the RAN list). In operation, the Matrix communicates with the EPC 805. The various RAN bands communicate 817 with Ultrex devices (and the outside world of UEs (user equipment) that have the same or similar capabilities of Ultrex devices 802 and may also communicate with parts of the universe of IoT (Internet of Things) devices 824.

Figure 9:
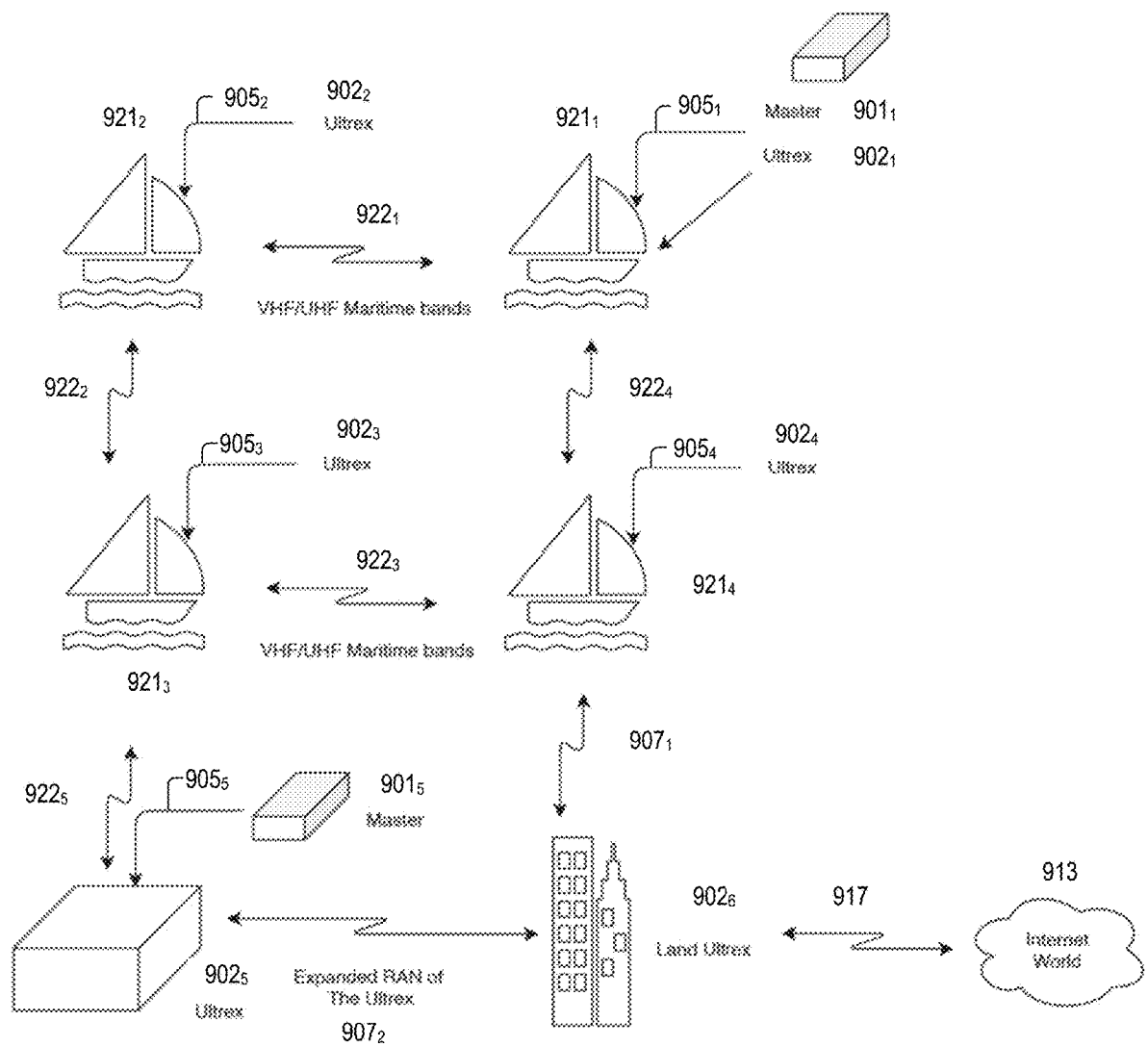
FIG. 9 shows aspects of a maritime application according to some embodiments.

FIG. 9 shows aspects of a maritime application according to some embodiments. The drawing illustrations can represent a number of different types of sailing vessels 921$_{1-4}$—boats and ships. The drawing shows two Master devices 901$_1$ and 901$_5$. The Master device 901$_1$ communicates with vessel 921$_1$ that has an Ultrex 902$_1$ via link 905$_1$, and Master device 901$_5$ communicates with Ultrex 902$_5$ via link 905$_5$ which may be located in another vessel (not shown) or some other vehicle (e.g., drone, helicopter, truck, forklift, etc.) or item (e.g., buoy, pier, port, crane, warehouse, etc.) (not shown).

The Ultrex devices in each of the vessels 921$_{1-4}$ communicate with each other via communication links 922$_{1-5}$. In some embodiments, the communication links 922$_{1-5}$ comprise UHF/VHF bands that have been assigned for maritime use. FIG. 9 also shows Ultrex devices communicating with a land-based Ultrex device 902$_6$, through use of the expanded RAN capabilities of the Ultrex $902_6$. The land-based Ultrex $902_6$ can communicate with the other parties via communication link 917 to the Internet 913.

Figure 10:
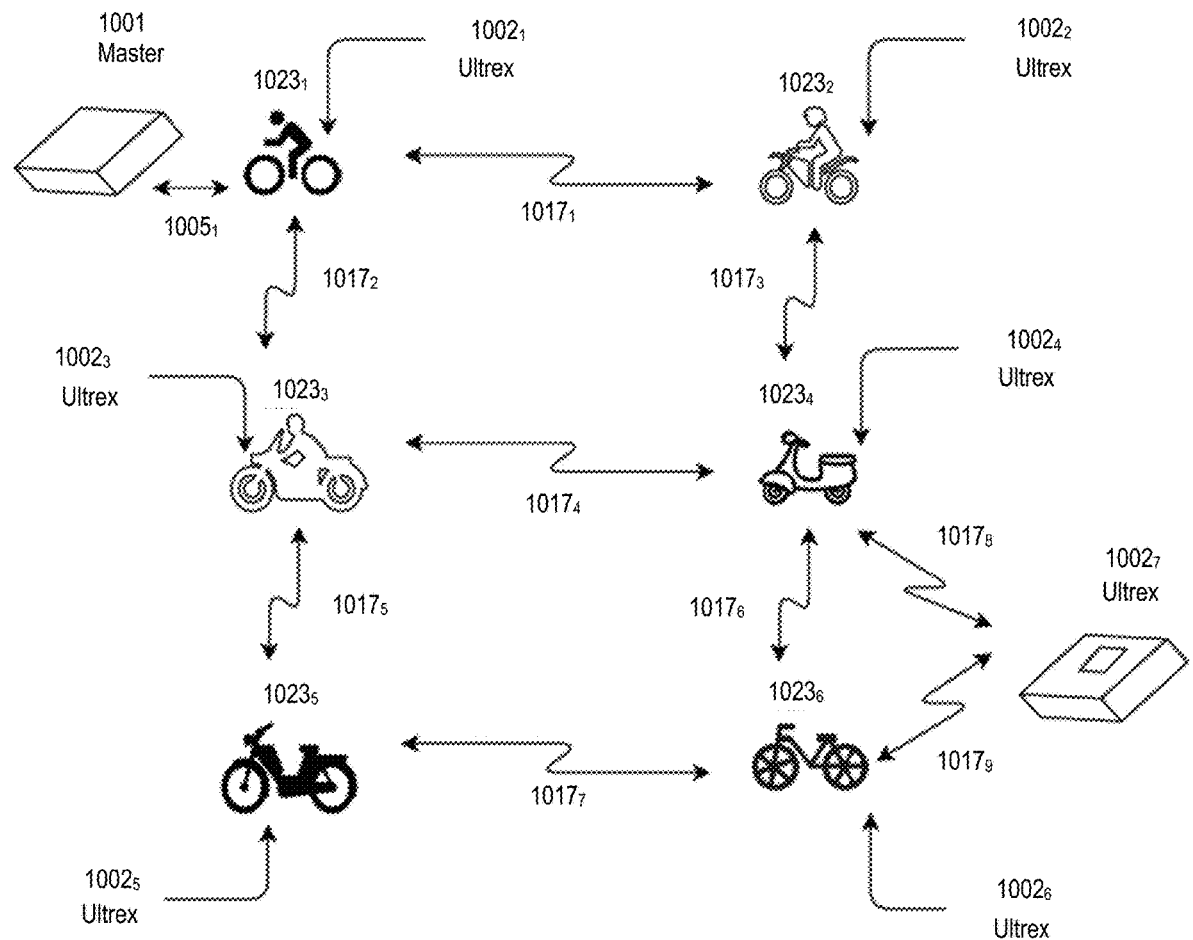
FIG. 10 shows aspects of a personal wheeled vehicle network according to some embodiments.

FIG. 10 shows aspects of a personal wheeled vehicle network according to some embodiments. FIG. 10 shows multiple different types of personal wheeled vehicles $1023_{1-6}$, including bicycles, motorcycles and others. A Master 1001 communicates with Ultrex $1002_1$ on a bicycle $1023_1$ via communications link $1005_1$. The Ultrex devices $1002_{1-6}$ associated with the vehicles $1023_{1-6}$ in the group communicate with each other via communications links $1017_{1-7}$ using their choice of available spectrum. FIG. 10 also shows Ultrex devices $1002_4$ and $1002_6$ associated with two of the vehicles $1023_4$ and $1023_6$ communicating with Ultrex $1002_7$ outside of the group via communication links $1017_8$ and $1017_9$, respectively.

The above discussions relating to networks, network devices, software executed by (or for execution by) network devices, and methods of operating networks and network devices provide only some examples of operating environments within which functions and features described herein may be implemented. Other operating environments and configurations of networks and network devices not explicitly described herein may also be applicable and suitable for implementation of the disclosed features and functions.

As one type of example of intended use (by no means intended in any way to restrict numerous other types of intended use) we may consider a group of vehicles, which have a community of interest. These vehicles may be cars or trucks; motorcycles, bicycles or similar types of vehicles; boats; and others.

We can take, for example, a group of bicyclists, perhaps in a club or other organization. At least one member would download the dApp. This Master would pair the dApp with an initial member's Ultrex. The Master would receive a unique network identifier and also would receive a unique set of blockchain/smart contract identifiers.

The Ultrex devices would be of suitable dimensions for attachment to bicycles. The Ultrex devices of the other club members would be also paired with the Master. They would be enabled to communicate with each other and with any other networks that the group elected to communicate with, for example, perhaps some other bicycle or other riding clubs, or even far wider circles of other networks.

In use, the system would allow members to stay in touch, even in very difficult circumstances, for example if they were separated and were in a forest or other country surroundings and out of contact with any cellular cell sites. In an extreme situation an injured or lost member could communicate with other networks of bicyclists and others, for example cars, boat, planes or individuals that might be passing close to the remote location where the person experiencing the hardship was located.

Even in more ordinary circumstances, the system would allow the users to communicate without using cellular minutes of use or incurring any additional cellular carrier charges. Using the peer-to-peer capability of the system, their communications would also be highly secure from outside intrusion or hacking. If these users were in a situation where the peer-to-peer communications were not available, they would have the option to communicate via the legacy cellular, 3GPP, spectrum bands or perhaps via other public wireless networks or communications links.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways to implement such systems, methods, apparatus, and/or articles of manufacture.

Additionally, references herein to "embodiment" means that a particular feature, structure, or characteristic described in connection with the embodiment can be included in at least one example embodiment of the networks and network devices disclosed herein. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of networks, network devices, and software executed by (or for execution by) network devices. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the disclosed embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

What is claimed is:

1. A first network device comprising: one or more processors;
    at least one private wireless network interface configured for communicating via a private wireless wide area network (WAN); at least one private wireless signaling network interface; tangible, non-transitory computer-readable memory comprising instructions stored therein, which, in response to a request, cause the first network device to perform functions comprising for the private wireless WAN, maintaining a private network routing table implemented via a permissioned blockchain ledger updated via a private wireless signaling network, wherein the private network routing table comprises, for each node in the private wireless WAN, one or more of (i) a geographic location of the node, (ii) a network status of the node, or (iii) a network capability of the node; in response to a requirement to transmit data to a second network device, in response to determining that the second network device is reachable via the private wireless WAN based on the private network routing table, transmitting the data to a node in the private wireless WAN via the at least one private wireless network interface for delivery to the second network device via the private wireless WAN; the first network device, further comprising at least one public wireless network interface configured for communicating via the Internet; and further instructions stored in the, non-transitory computer-readable media that when executed, cause the first network device to perform further functions comprising: operating as a gateway between the private wireless WAN and the Internet; and in response to determining that the second network device is not reachable via the private wireless WAN based on the private network routing table, transmitting the data to the Internet via the at least one public wireless network interface for delivery to the second network device via the Internet.

2. The first network device of claim 1, wherein maintaining a private network routing table via a permissioned blockchain ledger comprises:
via the private wireless signaling network, receiving a new block for the blockchain ledger, the new block comprising an update to the private network routing table;
determining whether the new block is valid;
in response to determining that the new block is valid, executing an update to the private network routing table as a smart contract, and updating the permissioned blockchain ledger with the new block; and
in response to determining that new block is invalid, discarding the new block.

3. The first network device of claim 1, wherein maintaining a private network routing table via a permissioned blockchain ledger comprises:
determining whether a change has occurred in any one or more of (i) a geographic location of the first network device, (ii) a network status of the first network device, or (iii) a network capability of the first network device; and
in response to determining that a change has occurred in any one or more of the first network device's geographic location, network status, or network capability, generating a new block comprising an indication of change and broadcasting the new block to one or more nodes of the private wireless WAN via the private wireless signaling network.

4. The first network device of claim 1, wherein the private wireless signaling network is separate from the private wireless WAN and the Internet.

5. The first network device of claim 1, wherein the requirement to transmit data to a second network device comprises a requirement to transmit data received from another node in the private network to the second network device.

6. The first network device of claim 1, further comprising:
one or more local data interfaces, wherein the requirement to transmit data to a second network device comprises a requirement to transmit data received from one of the one or more local data interfaces to the second network device.

7. Non-transitory computer-readable memory comprising instructions stored therein, which, in response to a request, cause a first network device to perform functions comprising: for a private wireless WAN, maintaining a private network routing table implemented via permissioned blockchain ledger updated via a private wireless signaling network, wherein the private network routing table comprises, for each node in the private wireless WAN, one or more of (i) a geographic location of the node, (ii) a network status of the node, or (iii) a network capability of the node;
in response to a requirement to transmit data to a second network device,
in response to determining that the second network device is reachable via the private wireless WAN based on the private network routing table, transmitting the data to a node in the private wireless WAN via the at least one private wireless network interface for delivery to the second network device via the private wireless WAN; the non-transitory computer-readable media, wherein the functions further comprise: operating as a gateway between the private wireless WAN and the Internet; and in response to determining that the second network device is not reachable via the private wireless WAN based on the private network routing table, transmitting the data to the Internet via the at least one public wireless network interface for delivery to the second network device via the Internet.

8. The tangible, non-transitory computer-readable media of claim 7, wherein maintaining a private network routing table via a permissioned blockchain ledger comprises:
via the private wireless signaling network, receiving a new block for the blockchain ledger, the new block comprising an update to the private network routing table;
determining whether the new block is valid;
in response to determining that the new block is valid, executing an update to the private network routing table as a smart contract, and updating the permissioned blockchain ledger with the new block; and
in response to determining that new block is invalid, discarding the new block.

9. The tangible, non-transitory computer-readable media of claim 7, wherein maintaining a private network routing table via a permissioned blockchain ledger comprises:
determining whether a change has occurred in any one or more of (i) a geographic location of the first network device, (ii) a network status of the first network device, or (iii) a network capability of the first network device; and
in response to determining that a change has occurred in any one or more of the first network device's geographic location, network status, or network capability, generating a new block comprising an indication of change and broadcasting the new block to one or more nodes of the private wireless WAN via the private wireless signaling network.

10. The tangible, non-transitory computer-readable media of claim 7, wherein the private wireless signaling network is separate from the private wireless WAN and the Internet.

11. The tangible, non-transitory computer-readable media of claim 7, wherein the requirement to transmit data to a second network device comprises a requirement to transmit data received from another node in the private network to the second network device.

12. The tangible, non-transitory computer-readable media of claim 7, wherein the requirement to transmit data to a second network device comprises a requirement to transmit data received from at least one local data interfaces to the second network device.

13. A method of operating a network, the method comprising, at a first network device: for a private wireless WAN, maintaining a private network routing table implemented via a permissioned blockchain ledger updated via a private wireless signaling network, wherein the private network routing table comprises, for each node in the private wireless WAN, one or more of (i) a geographic location of the node, (ii) a network status of the node, or (iii) a network capability of the node; in response to a requirement to transmit data to a second network device, in response to determining that the second network device is reachable via the private wireless WAN based on the private network routing table, transmitting the data to a node in the private wireless WAN via the at least one private wireless network interface for delivery to the second network device via the private wireless WAN; further comprising: operating as a gateway between the private wireless WAN and the Internet; and in response to determining that the second network device is not reachable via the private wireless WAN based on the private network routing table, transmitting the data to the Internet via the at least one public wireless network interface for delivery to the second network device via the Internet.

14. The method of claim 13, wherein maintaining a private network routing table via a permissioned blockchain ledger comprises:
via the private wireless signaling network, receiving a new block for the blockchain ledger, the new block comprising an update to the private network routing table;
determining whether the new block is valid;
in response to determining that the new block is valid, executing an update to the private network routing table as a smart contract, and updating the permissioned blockchain ledger with the new block; and
in response to determining that new block is invalid, discarding the new block.

15. The method of claim 13, wherein maintaining a private network routing table via a permissioned blockchain ledger comprises:
determining whether a change has occurred in any one or more of (i) a geographic location of the first network device, (ii) a network status of the first network device, or (iii) a network capability of the first network device; and
in response to determining that a change has occurred in any one or more of the first network device's geographic location, network status, or network capability, generating a new block comprising an indication of change and broadcasting the new block to one or more nodes of the private wireless WAN via the private wireless signaling network.

16. The method of claim 13, wherein the private wireless signaling network is separate from the private wireless WAN and the Internet.

17. The method of claim 13, wherein the requirement to transmit data to a second network device comprises at least one of: (i) a requirement to transmit data received from another node in the private network to the second network device or (ii) a requirement to transmit data received from at least one local data interface to the second network device.

\* \* \* \* \*